Patented July 2, 1929.

1,719,432

UNITED STATES PATENT OFFICE.

CHARLES J. KINZIE, OF NIAGARA FALLS, NEW YORK, ASSIGNOR TO THE TITANIUM ALLOY MANUFACTURING COMPANY, OF NEW YORK, N. Y., A CORPORATION OF MAINE.

COLORED OPACIFYING PIGMENTS AND METHOD OF MAKING SAME.

No Drawing.    Application filed January 21, 1927. Serial No. 162,683.

My invention relates to the use of zirconium and zirconium oxides or zirconia as a pigment or opacifier in vitreous enamels, and particularly relates to the production of colored opacifiers and pigments and the use of same in vitreous enamels whereby the desired colors may be economically and readily imparted to the resulting enamels.

In the preparation of vitreous enamels particularly colored enamels several methods have been in common use for imparting the desired color to the enamel.

In certain methods the enamel is colored by smelting in the desired inorganic coloring material which dissolves in the melt and imparts its characteristic color to the enamel frit. This frit is milled and if the enamel frit is not sufficiently opaque an opacifier is added at the mill along with other additions depending upon the requirements.

According to other methods the enamel frit is prepared without color and specially prepared coloring oxides or compounds are added at the mill along with the separately prepared opaquing medium such as tin oxide, etc.

Both of these methods for preparing colored enamels possess certain inherent shortcomings in practice.

In the first instance the use of the melting furnace for melting one colored frit precludes the use of the same furnace for other colors or for white, except by expensive cleaning between changes. When different shades and colors are required in the same plant the preparation of several colored frits is at best an expensive and troublesome operation.

In the second instance mentioned the coloring oxides available are purchased at an almost prohibitive price and the experience of enamelers indicates that these coloring oxide compounds are seldom uniform in coloring effects, due probably to lack of standardization in processing. The introduction at the mill of a relatively small amount of a highly concentrated color does not tend to produce a uniformly colored enamel in all cases.

I have discovered that if the inorganic coloring material is first intimately mixed with the opacifier and a fluxing agent and then subjected to a heating operation to fix and distribute the color intimately and homogeneously with the opacifier and this roasted product is disintegrated (preferably in a wet mill) followed usually by water washing to remove excess of flux or water soluble materials and then dried, a composite coloring and opacifying pigment will be produced which enables the enameler to supply both the opaquing agent and coloring material in one addition, thus simplifying his part of operation as well as producing more uniformly colored enamels.

The following detailed procedure will serve to illustrate the nature of my discoveries:

The following charge was prepared by weighing out the ingredients and intimately mixing by careful grinding.

| | Grams. |
|---|---|
| Zirconium oxide | 500 |
| Cobalt oxide | 50 |
| Flux mixture { 35.82% potash feldspar<br>2.62% sodium nitrate<br>20.96% borax<br>19.21% boric acid<br>10.91% zinc oxide<br>10.48% cryolite } | 92 |
| | 642 |

However, I do not wish to restrict myself to this particular fluxing mixture. I usually prefer to have the fluxing mixture contain substantial amounts of boron compounds. The above mixture appears to work well in most instances. A soft enamel mixture without the opacifier is thereby produced.

This mixture was then heated at 950° C. for three hours. The temperature and time may be varied greatly depending upon circumstances. The roasted product while hot is a dry mass in a more or less aggregated powder and it is of such a nature as not to stick or adhere to the furnace thereby making it possible to use one furnace for the preparation of several colored pigments. This product is then cooled and wet-milled sufficiently to reduce to powdered state (finer than 325 mesh) and dried.

Example A.

An enamel slip was made as follows:

| | Parts. |
|---|---|
| Frit | 100 |
| Enameling clay | 5.48 |
| Colored opacifier | 10.00 |

This charge was milled until the frit was of desired fineness which may be varied depending upon whether slip is for the first or second coat and also somewhat upon type of article to be enameled.

The slip was then aged several days, according to the usual practice, and then suitable sheet iron pieces, previously coated with a ground coat, were coated with this slip, dried and fired. A second coat was thereafter applied dried and fired. The result was a uniformly blue colored opaque enamel coating of good lustrous surface.

*Example B.*

In this instance the zirconia was heated with the flux in absence of any coloring agent, that is the 500 zirconia and 92 flux mixture of Example A and the cobalt oxide was subsequently added at the mill along with clay and zirconia opacifier and enamel frit to form the following enamel slip:

| | Parts. |
|---|---|
| Frit | 100 |
| Enameling clay | 5.48 |
| Zirconia preparation | 9.20 |
| Cobalt oxide | 0.80 |

The enamel slip was prepared by milling to same degree of fineness as for Example A and then aged, and article enameled as in Example A. The result was that the enamel produced was not as uniformly colored, and furthermore it appeared that the cobalt oxide was injuriously acted upon during the firing of the enamel because, if slightly overfired, the surface was roughened with blister formations.

I have also tested with the same procedures given in A and B but substituting such coloring materials as chromium oxide, manganese oxide, copper oxide, iron oxide, ferrous titanate (ilmenite), nickel oxide, titanium oxide (both in form of rutile and in form of the purer precipitated oxide preparations).

In practically all instances it was found that when the oxide was added separately to enamel at mill it would be much less resistant to heat in the firing operation.

However, when heated with the zirconia and flux prior to use in enamels, cobalt produced a dark blue coloration, chromium a good chrome green, copper a robin's egg blue, manganese a dark flesh tone, iron oxide a brownish red color, ilmenite a brown and titanium from brown to yellow, depending upon whether rutile or the pure oxide was used. By mixing the colored opacifiers in various proportions various useful shades have been produced, such as good gray tones, ivory tones, etc.

The zirconium oxide used as the raw material was in form known as "crude zirconia", obtained as an intermediate by the oxidation of zirconium cyanonitride according to the process set forth in Barton's U. S. Letters Patent No. 1,351,091 of August 31, 1920, followed by wet milling to 325 mesh, and calcining both to form a dry product and at the same time to burn out any free carbon left in initial oxidation process. This zirconia usually carries about 95% $ZrO_2$.

For certain purposes I might preferably use the product described in my U. S. Letters Patent No. 1,588,476 of June 15, 1926, for preparation of the colored zirconium pigment. Any zirconium oxide or preparation containing zirconium in opaque form could be used as the source of zirconium for this process. The coloring effects of included inorganic coloring oxides is modified by the degree of fineness and opaquing strength of the zirconium opacifier used, but this is a controllable factor in milling problems and opacifier processes.

For certain purposes especially for producing very intense colors it may not be required to have as much opacity as the above mentioned zirconium oxide preparation would impart and hence I have successfully substituted zirconium silicate for the zirconium oxide in Example A. When such substitution is made the color was more intense and opacity was less. Likewise substantially the same effect could be produced by reducing the zirconium oxide in Example A and substituting inert cheap materials such as aluminum silicate (clay) silica (quartz, flint, etc.) or aluminum oxide as well as other materials resistant to the firing operation. However, it is preferable to have the colored pigment possess its maximum opacity as better enamels result if such are well opaqued as well as highly colored.

It will be understood that the amount of coloring oxide indicated in Example A can be varied to suit the requirements and also, if desired, a mixture of coloring oxides or inorganic coloring materials could be used in place of a single coloring agent in the preparation of the composite opaquing and coloring agent. I prefer to make the types of pigment separately so as to embrace the range required by the enameling trade and these can be used either singly or combined to yield any of a large number of possible colors and degrees or shades of color.

While these colored opacifying pigments having such zirconium base are particularly adapted for vitreous enamels, they may also serve as useful pigments for paints where an inert pigment of high specific gravity and low oil-absorbing capacity is desired.

I claim as my invention:

1. The method of making composite colored opacifying pigments for vitreous enamels which comprises heating a charge composed preponderatingly of a zirconium compound, a fluxing agent and coloring material with homogeneous distribution of said coloring material through the zirconium compound, and cooling the resulting mass.

2. The method of making composite colored opacifying pigments for vitreous enamels which comprises heating a charge composed preponderatingly of zirconium, a fluxing agent and coloring material with homogeneous distribution of said coloring material through the zirconia, and cooling the resulting mass.

3. The method of making composite colored opacifying pigments for vitreous enamels which comprises heating a charge composed preponderatingly of a zirconium compound, a fluxing agent and coloring material for about three hours at about 950° C. with homogeneous distribution of said coloring material through the zirconium compound, and cooling the resulting mass.

4. The method of making composite colored opacifying pigments for vitreous enamels which comprises heating a charge composed preponderatingly of zirconia, a fluxing agent and coloring material for about three hours at about 950° C. with homogeneous distribution of said coloring material through the zirconia, and cooling the resulting mass.

5. The method of making composite colored opacifying pigments for vitreous enamels which comprises heating a charge composed preponderatingly of a zirconium compound, a fluxing agent and coloring material with homogeneous distribution of said coloring material through the zirconium compound, and cooling and comminuting the resulting mass.

6. The method of making composite colored opacifying pigments for vitreous enamels which comprises heating a charge composed preponderatingly of zirconia, a fluxing agent and coloring material with homogeneous distribution of said coloring material through the zirconia and cooling and comminuting the resulting mass.

7. The method of making composite colored opacifying pigments for vitreous enamels which comprises heating a charge composed preponderatingly of a zirconium compound, a fluxing agent containing substantial amounts of boron compounds and inorganic coloring material with homogeneous distribution of said coloring material through the zirconium compound, and cooling the resulting mass.

8. The method of making composite colored opacifying pigments for vitreous enamels which comprises heating a charge composed preponderatingly of zirconia, a fluxing agent and inorganic coloring material to formation of a dry roasted product with homogeneous distribution of the color material through the zirconia, concurrently cooling the roasted product and comminuting it.

9. The method of making composite colored opacifying pigments for vitreous enamels which comprises heating a charge composed preponderatingly of zirconia, a fluxing agent and inorganic coloring material for about three hours at about 950° C. to formation of a dry powdered mass.

10. The method of making composite colored opacifying pigments for vitreous enamels which comprises heating a charge composed preponderatingly of zirconia, a fluxing agent containing substantial amounts of boron compounds and inorganic coloring material for about three hours at about 950° C. to formation of a roasted product with homogeneous distribution of the color material through the zirconia, concurrently cooling the roasted product and comminuting it.

11. A composite colored opacifying pigment consisting of a vitreous mass composed preponderatingly of a zirconium compound, a flux and inorganic color material fixed and homogeneously distributed throughout the zirconium compound.

12. A composite colored opacifying pigment consisting of a vitreous mass composed preponderatingly of zirconia, a flux and inorganic color material fixed and homogeneously distributed throughout the zirconia.

13. A composite colored opacifying pigment consisting of a vitreous mass containing finely disseminated particles of a double compound of zirconium and boron carrying inorganic coloring material fixed and homogeneously distributed throughout said mass.

14. The method of producing colored opaque enamels which comprises adding to the enameling material a vitreous mass composed preponderatingly of a zirconium compound, a flux and inorganic color material fixed and homogeneously distributed throughout the zirconium compound.

15. The method of producing colored opaque enamels which comprises adding to the enameling material a vitreous mass composed preponderatingly of zirconia, a flux and inorganic color material fixed and homogeneously distributed throughout the zirconia.

16. The method of producing colored opaque enamels which comprises adding to the enameling material a vitreous mass containing finely disseminated particles of a double compound of zirconium and boron carrying inorganic coloring material fixed and homogeneously distributed throughout said mass.

17. A colored opaque enamel comprising, as the medium for producing colored opacity, a roasted mixture of a zirconium compound, a fluxing agent and coloring material fixed and homogeneously distributed through the zirconium compound.

18. A colored opaque enamel comprising, as the medium for producing colored opacity, a roasted mixture composed preponderatingly of a zirconium compound, a fluxing agent and coloring material fixed and homogeneously distributed through the zirconium compound.

19. A colored opaque enamel comprising, as the medium for producing colored opacity, a roasted mixture composed preponderatingly of a zirconium compound, a fluxing agent and inorganic coloring material fixed and homogeneously distributed through the zirconium compound.

20. In the method of making a composite colored opacifying pigment the step which consists in roasting a charge composed preponderatingly of zirconia, a fluxing agent and inorganic coloring material with homogeneous distribution of said coloring material through the resulting product.

21. In the method of making a composite colored opacifying pigment the step which consists in roasting a charge composed preponderatingly of zirconia, a fluxing agent and inorganic coloring material for about three hours at 950° C. with homogeneous distribution of said coloring material through the resulting product.

22. In the method of making a composite colored opacifying pigment the step which consists in roasting a charge composed preponderatingly of zirconia, a fluxing agent and cobalt oxide for about three hours at 950° C. with homogeneous distribution of said cobalt oxide through the resulting product.

CHARLES J. KINZIE.